Figure 1:
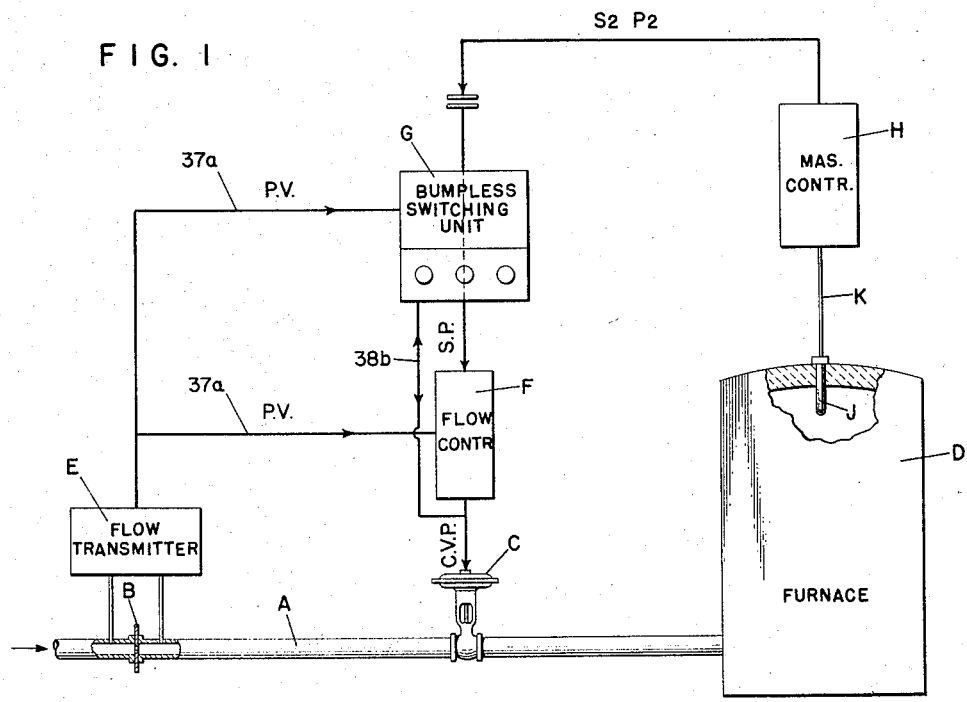

May 5, 1959 H. E. ELLER 2,884,939
AUTOMATIC BUMPLESS SWITCHING CONTROLLER
Filed Dec. 13, 1955 5 Sheets-Sheet 1

*INVENTOR.*
HAROLD E. ELLER
BY
ATTORNEY.

INVENTOR.
HAROLD E. ELLER

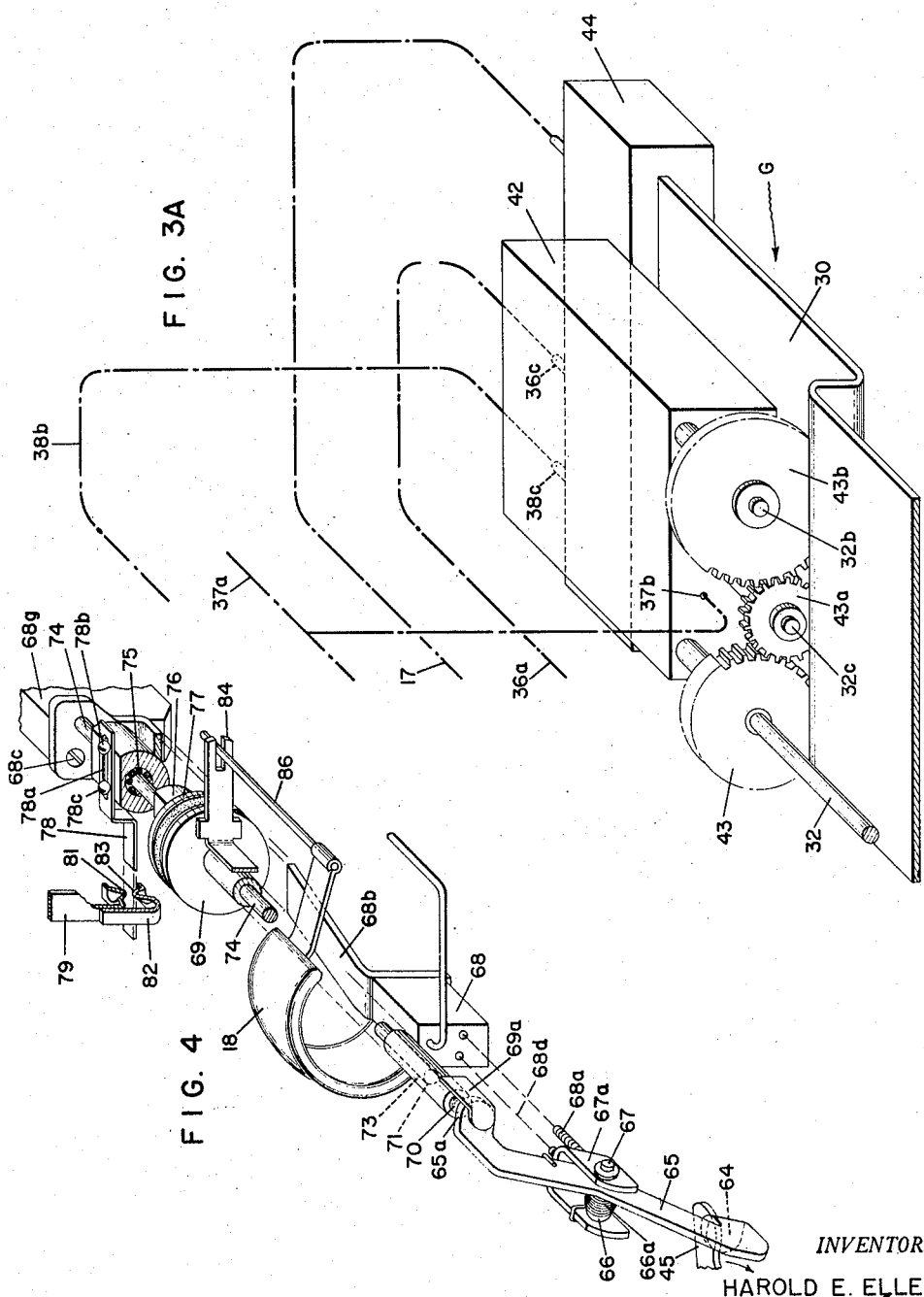

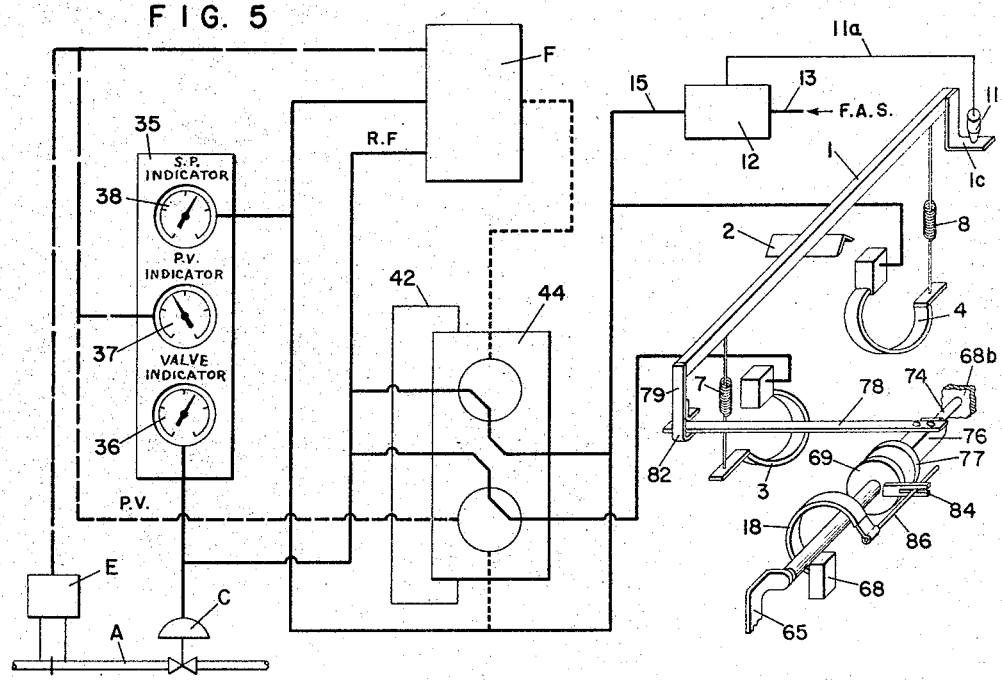

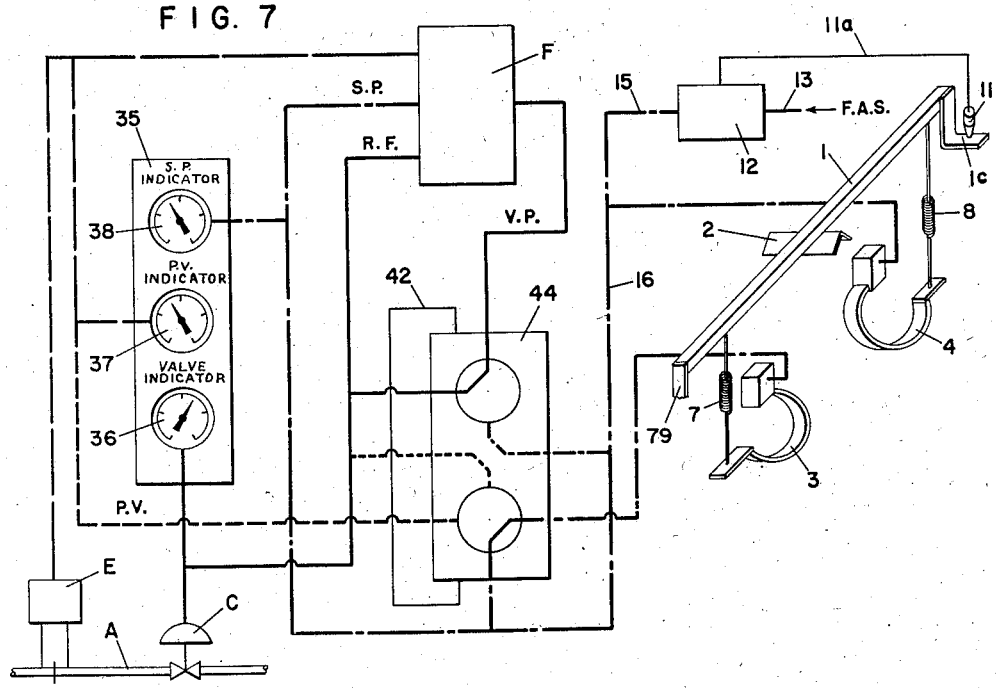
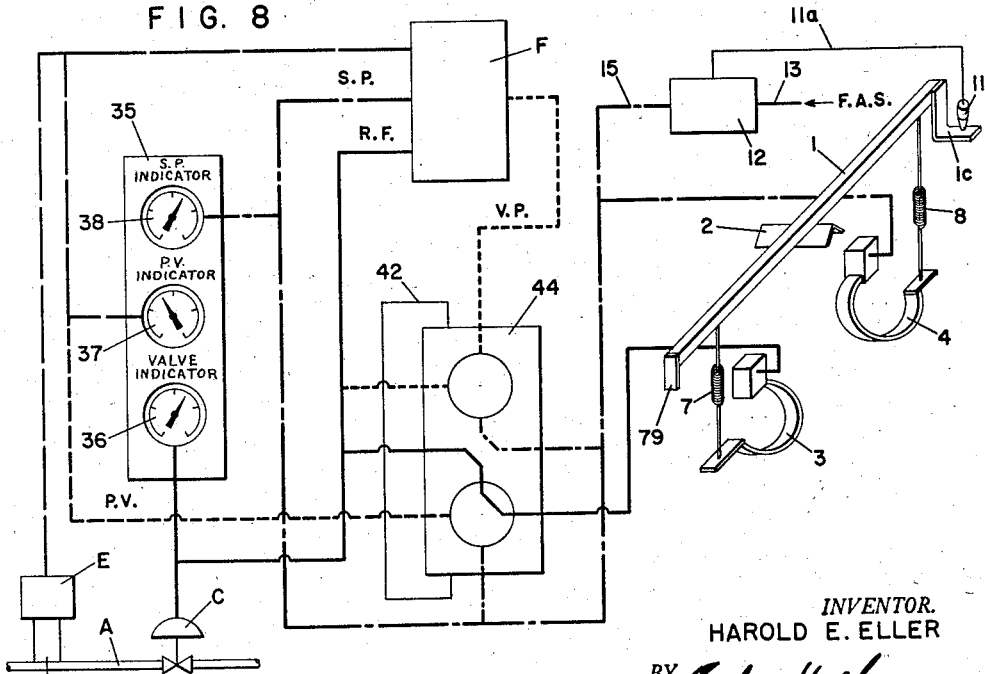

United States Patent Office 2,884,939
Patented May 5, 1959

2,884,939
AUTOMATIC BUMPLESS SWITCHING CONTROLLER

Harold E. Eller, El Paso, Tex., assignor to Minneapolis-Honeywell Regulator Company, Minneapolis, Minn., a corporation of Delaware Application December 13, 1955, Serial No. 552,857

19 Claims. (Cl. 137—82)

A general object of the present invention is to provide improved pneumatic control apparatus. More specifically, the object of the present invention is to provide novel pneumatic control apparatus adjustable between one condition in which control is effected by automatic adjustment of a control force, and a second condition in which control is effected by manual adjustment of a control force.

A further more specific object of the invention is to provide a means for switching a fluid pressure controller from manual control to automatic control and vice versa without requiring an operator to precisely match the fluid pressure already on a control valve with another fluid pressure about to be applied to this control valve and to thus avoid a bump or pressure shock in the course of this switching operation.

Heretofore in fluid pressure controllers when a bumpless switching apparatus was used to directly switch from manual to automatic control or from automatic to manual control it was necessary to make the fluid pressure then acting on the control valve precisely equal to another pressure to be applied to the valve before making the aforementioned switch. To perform such a bumpless switching operation it was necessary to place such switching apparatus in a "seal" position or a position in which the value of the two aforementioned pressures could be manually lined out with one another. When these two pressures were equalized in this manner, the switch could then be moved from this "seal" position to an automatic position without a pressure bump occurring when switching from manual to automatic or vice versa.

Instead of precisely equalizing the aforementioned pressures the bumpless switching apparatus disclosed in this application establishes a controlling relationship between a process variable and the output control pressure of a pneumatic controller to accomplish a direct rather than the indirect pressure balancing method of bumpless switching noted supra.

The present invention differs from this conventional form of bumpless switching apparatus in that it is not necessary to delay such a bumpless switching operation by stopping the apparatus in a seal position when shifting from manual to automatic or automatic to manual to perform the pressure balancing function noted supra.

It is, therefore, another object of the present invention to provide an apparatus which when combined with a controller can be directly switched from a manual to automatic position or from an automatic to manual position without the necessity of stopping in a seal position for purposes of manual intervention to balance out the pressure then being applied to the control valve with the fluid pressure about to be applied to a control valve.

When an operator is using the bumpless switching apparatus that will be hereinafter disclosed it is not necessary for him to closely observe gauges to make sure that the aforementioned two pressures are of the same magnitude before effecting a bumpless switch operation as has heretofore been required.

It is thus another object of the present invention to eliminate the need for the operator to determine the instant that the reading of a pressure gauge, representing the pressure then on the control valve, has been lined out with the reading of the pressure gauge representing the pressure that is to be applied to the control valve before completing a bumpless switching operation.

Furthermore, another object of the present invention is to eliminate the necessity of using a manually adjusted pressure regulator which heretofore has been necessary in making such gauge pressures equal when performing such a bumpless switch operation.

A still more specific object of the present invention is to provide a transfer valve which will permit the fluid pressure being transmitted to a control valve to follow the manual tension applied to the free end of a receiving bourdon, located in a bumpless switching apparatus, when such apparatus is in a Manual position and will also permit a set point pressure of a controller to be transferred to this same bourdon, when the bumpless switching unit is in an automatic position so that any tension applied to the bourdon when in this latter position will change the value of the controller's set point.

In preferred embodiments of the present invention, the adjustment of the apparatus between its manual and automatic operating conditions is effected by the use of two or more Bourdon tubes, one of which is continuously responsive to variations in a variable fluid pressure, while an associated Bourdon tube hereinafter referred to as a receiving bourdon may expand and contract in response to internal pressure changes, or may be locked in a position in which it does not expand or contract in response to internal pressure changes.

In certain types of fluid flow control problems it is desirous to alter the set point of a flow controller in accordance with an output signal of a master controller measuring another variable, such as the temperature of a furnace. In such systems a differential pressure measuring device is used to measure the rate of flow of a fluid passing through a flow line and to send a fluid pressure signal P.V. which is a function of that flow rate directly to a flow controller. This system employs the aforementioned master controller to measure a variable, such as the temperature of a furnace into which this flow of fluid passes, and to transmit this measurement in the form of a fluid pressure signal to the flow controller to vary its set point. The master controller tied in with a flow controller in this manner is commonly referred to as a cascade system.

The present invention also employs a bourdon, hereinafter referred to as a cascade bourdon in the aforementioned bumpless switching apparatus. This cascade bourdon is also actuated by the set point adjusting fluid pressure signal sent from the aforementioned master controller.

The cascade signal for the master controller is applied to the Bumpless Switching unit in such a way that variations in the cascade signal, transmitted by the master controller, causes proportional variations in the output signal of the unit. The overall set point signal being transmitted may also be adjusted in accordance with the tension manually applied to the receiving bourdon.

It is therefore still a further object of the invention to provide a bumpless switching apparatus which may have readily attached or detached thereto a means for effecting the aforementioned cascade type of control.

Another specific object of the invention is to provide control apparatus of the general character specified and including a control unit operative to bumplessly switch from a manual or automatic position to and from the aforementioned automatic cascade control.

Heretofore, when using a cascade switching apparatus it has been necessary to adjust a fluid pressure regulator while a e.g. cascade-manual shifting operation took place in order to make the cascade pressure acting on the apparatus equal to another pressure about to be applied to the apparatus. It therefore becomes another object of the invention to provide a bumpless switching apparatus that does not require an operator to perform this pressure matching operation when such a cascade-manual shifting operation is performed.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Figure 2:
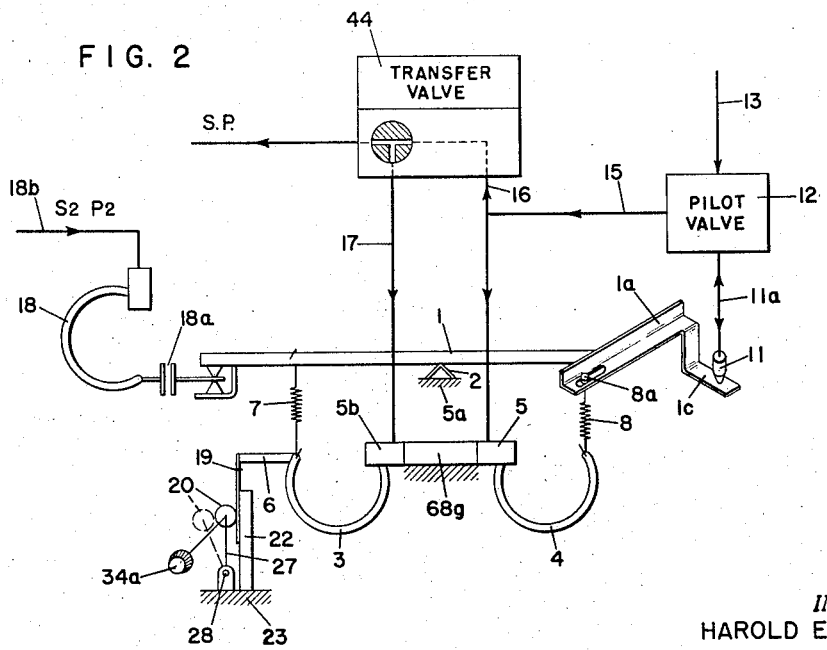
Figure 3:
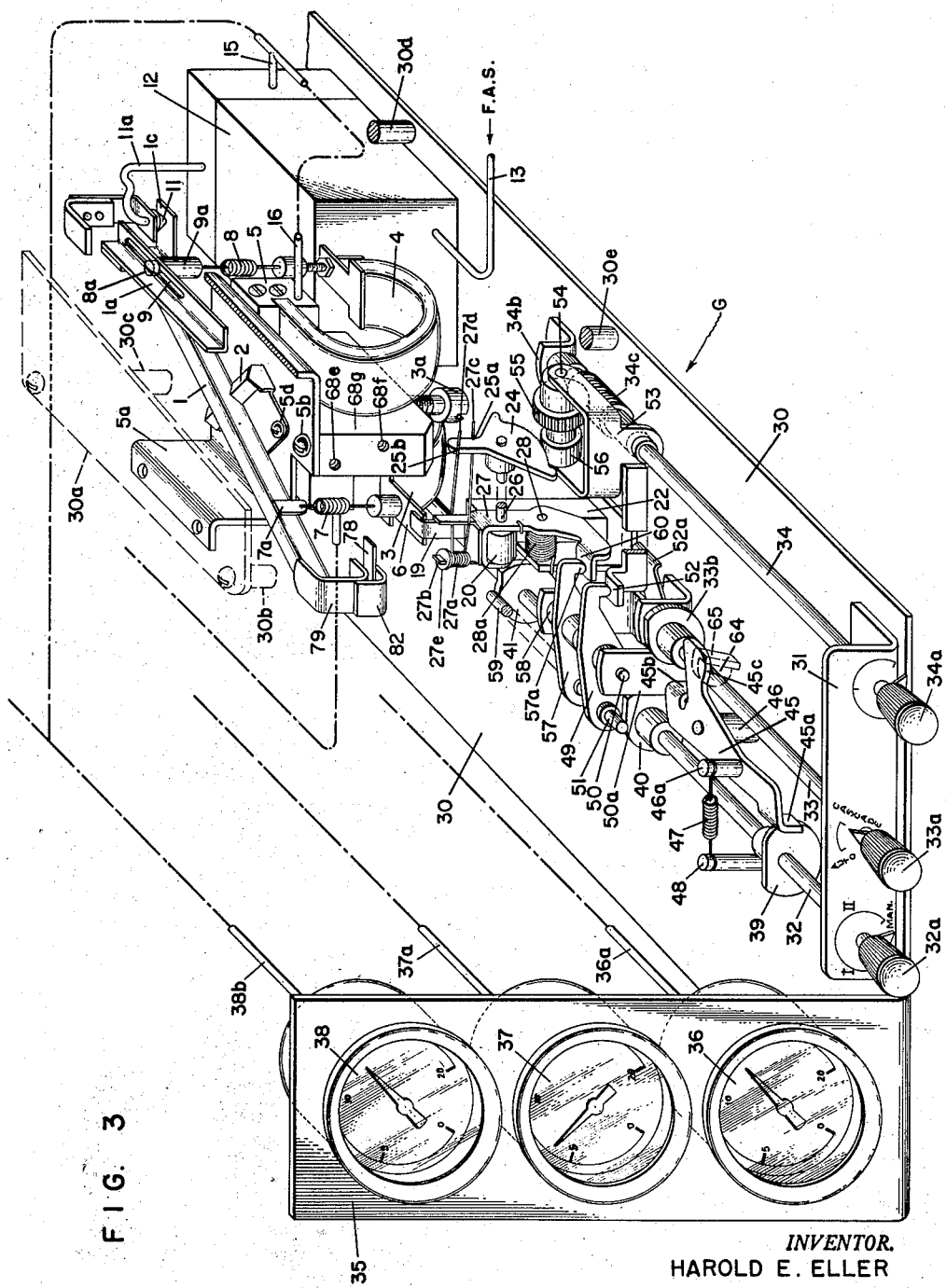

Of the drawings:

Fig. 1 is a block diagram;

Fig. 2 schematically illustrates apparatus adapted for use in the practice of the present invention;

Fig. 3 diagrammatically illustrates the front portion of a form of apparatus adapted for use in effecting either manual or automatic control with or without cascade operation;

Fig. 3A diagrammatically illustrates the rear portion of a form of apparatus adapted for use in effecting either manual or automatic control with or without cascade operation;

Fig. 4 diagrammatically illustrates a cascade clutching apparatus for use in association with the apparatus shown in Fig. 2;

Fig. 5 diagrammatically illustrates a form of control mechanism analogous to that shown diagrammatically in Figs. 2, 3 and 4; and Figs. 6, 7 and 8 each illustrate a different operative adjustment of the apparatus illustrated in Fig. 5.

Fig. 1 shows one application in which the bumpless switching unit of the present invention may be employed. As shown in this Fig. 1 there is a conduit A through which a fluid, such as fuel oil, is permitted to flow in the direction of the arrow through an orifice B past a control valve C into a furnace D. On either side of the orifice B there is shown two conduits for transmitting the pressure different that exists on either side of the orifice B to a differential pressure measuring and transmitting means E. This means may be any commercially available apparatus which is capable of transmitting a fluid pressure process variable signal P.V. which is a function of the flow of fluid through the conduit A. This output fluid pressure signal P.V. is shown connected by conduit 37a to a flow controller F which may be of a well known stack type having reset and a cut out relay incorporated therein. This flow controller F is also connected to a bumpless switching unit G of the present invention by way of a transfer switch and transfer switch manifold forming a part of this switching unit G and shown in detail in the subsequent figures of the drawing. Also shown connected to this bumpless switching unit is a set point pressure line S2, P2. At the other end of this set point and pressure line S2, P2 there is shown a master controlling means H. Any type of conventional temperature measuring and controlling means may be used for the device schematically shown as H. For example, any means which is capable of measuring, controlling, and transmitting a fluid pressure representative of a function of temperature sensed by a suitable bulb J through a fluid filled line K connected to a stack controller H is suitable.

As the flow through the conduit A, for example, increases the differential pressure measuring means will send an increased signal P.V. to the flow controller F. As this increased flow enters the furnace D in Fig. 1, the temperature of the furnace will increase. While this flow P.V. increase is being transmitted to controller F the furnace temperature increase is being sensed by the element J and master controller H and a pressure signal S2, P2 representing such an increase is being transmitted through a conduit through the bumpless switching unit G to the flow controller F. This will enable the set point of the controller F to be regulated in accordance with the change in temperature of the furnace D. When a master controller H is tied in with the flow controller F in the aforementioned manner a type of control known as cascade is made possible. When this cascade control is effected in this way the fluid pressure that is transmitted from the flow controller F through the control valve pressure line C.V.P. to the head of the control valve C will be regulated to a set point value which is varied in accordance with another variable e.g. furnace temperature as sensed by the master controller H.

As will be hereinafter described the bumpless switching unit G including the transfer switch 42 and transfer switch manifold 44, shown in Fig. 3A, is concerned with preventing a pressure change from occurring in the control valve pressure line C.V.P. when switching the bumpless switching unit G from a position in which the control valve pressure is manually adjusted to a position in which this control valve pressure is automatically adjusted by the flow controller F when either in an automatic or cascade-automatic position.

The present invention is also concerned with making a reverse switch, that is, a switch from a position in which the control valve pressure is automatically controlled by the flow controller F when in automatic or in cascade to a position wherein the control valve pressure is being controlled manually by means of the bumpless switching unit G.

The apparatus schematically illustrated by way of example in Fig. 2, includes a beam 1 mounted to oscillate about a stationary pivot 2 of a resilient angle configuration engaging the underside of the beam intermediate the beam ends. The receiving bourdon 3 and the balancing bourdon 4 have fixed ends connected to spaced apart portions of a stationary supporting member 5 diagrammatically shown in Fig. 2 as below the beam 1. It should be noted at this point that in Fig. 3, the pivot 2 is supported by a stationary plate 5a which in turn is fixedly attached to a top plate 30a and that this latter plate 30a is in turn connected to base plate 30 by suitable posts 30b and 30c. In Fig. 3 the undersides of the stationary plate 5a are shown anchored to the stationary ends of the Bourdon tubes 3 and 4 whereas in Fig. 2, for clarity purposes, only a portion of the plate 5a is shown. In the apparatus shown, the Bourdon tubes 3 and 4 respectively serve as fluid pressure receiving, and balancing units. The second or free end of the Bourdon tube 3 as shown in Fig. 2 is connected to a rigid, bodily adjustable, member 6 which is stationary during one operating condition and is vertically movable during another operating condition.

As shown in Fig. 2, the member 6 is connected to a portion of the beam 1 at the left of the pivot 2 by a tension spring 7, and the end of the balancing Bourdon tube 4 remote from the support member 5 is connected by a tension spring 8 to a portion of the beam 1 at the side of the pivot 2 remote from the portion of the beam to which the tension spring 7 is connected. As diagrammatically shown in Fig. 2, the end of the spring 8 remote from the free end of the balancing bourdon 4 is shown fixedly attached to the right end portion 1a of the beam 1 by way of a screw means 8a inserted in slot 9. This screw means 8a is schematically shown in Fig. 2 as mounted for longitudinal adjustment along the slotted portion 9 of the beam portion 1a. As shown in Fig. 3 a yoke member 9a may be adjustably secured to the portion of the beam 1a surrounded by said yoke by the clamping screw 8a. The adjustment of the upper end of the spring 8 in this manner, along the length of the beam portion 1a, is used to effect a span adjustment of the apparatus.

In Fig. 2, the right hand end of the beam 1 is normally free to move up or down, as operating conditions vary, and thereby variably throttle the outlet bleed nozzle 11 of a pilot valve amplifying relay 12. The latter normally receives air at a constant pressure through an air supply pipe 13 and the bleed nozzle back pressure increases or decreases as the nozzle 11 is variably throttled by a movement of the beam 1 and its extended flapper portion 1c toward or away from said nozzle. The output pressure of the pilot valve 12 is connected by a lateral branch pipe 15 to a conduit 16. One end of the pipe line 16 is connected to the stationary end of the balancing Bourdon tube 4 which is fixedly mounted in support member 5. Thus the pressure in the balancing bourdon 4 and pipe 16 will be varied by the pilot valve 12 in accordance with the displacement of the beam's flapper portion 1c from the nozzle 11.

A variable fluid pressure is transmitted to the receiving Bourdon tube 3 through a pipe 17. That pipe opens into the end of the Bourdon tube 3 which is adjustably connected to the supporting member 5. In ordinary practice, the pressure transmitted when on Manual control, to the bourdon 3 through the pipe 17 is the same as the pressure that is on the head of a control valve C shown in Fig. 1.

During manual control when the bumpless switching unit is placed in one operating condition, the free end of the receiving Bourdon tube 3, the member 6 and a flat bar 19 which is transverse to and connected to one end of the member 6 are all prevented from moving by a clamping means. This clamping means is comprised of a roller 20 which forces the right vertical face of the bar 19 into engagement with the fixed vertical column 22. In Fig. 2, this roller 20 is schematically shown pivotally mounted for rotation on the pivot 28 of lever member 27. The latter is shown as parallel to and alongside the bar 19, and has one end pivotally connected to a stationary supporting member 23. When the bar 19 is in frictional engagement with the fixed column 22, the roller 20 is rotated by rotating the knob 34a, and the roller 20 will cause movement of the bar 19, adjustable member 6, and the free end of bourdon 3 in an upward or downward direction depending on the direction of rotation of the roller 20. When the roller 20 is not pressed against the bar 19, the latter is free to move in a substantially upward or downward direction depending on whether the pressure in the bourdon is decreasing or increasing. As is shown in Fig. 3, the roller 20 is fixedly mounted to shaft 26 which in turn is journaled in a U-shaped frame structure 27. This frame structure 27 in turn is pivoted to turn on and about the right end portion of a shaft 28.

In Fig. 3 the left end portion of the pivot shaft 28 is fixedly attached to the column 22. Surrounding the cylindrical portion of this shaft 28, there is, as shown in Fig. 3, a spring 28a having a right end portion in engagement with a front edge of the frame structure 27 and a left end portion in engagement with the rear surface of the column 22.

With this arrangement the roller 20 may be moved into or out of engagement with the bar 19 by rotating the frame structure 27 about its pivot 28. When a force is applied e.g. to make 27 rotate in a counter-clockwise direction from the position shown in Fig. 3, the roller 20 will be moved away from engagement with the bar 19. When, however, this force on 27 is released the spring 28a will rotate 27 about its pivot in a clockwise direction to the position shown in Fig. 3 wherein the roller will frictionally hold the bar 19 in engagement with 22.

A third Bourdon tube 18, commonly referred to as a cascade bourdon unit, is shown in Fig. 2 and in Fig. 4, and is hereinafter fully described in connection with Fig. 4. As shown in Fig. 2, the apparatus also includes cascade Bourdon tube 18 having its free end connected to the beam 1 by way of a clutch means 18a. When this clutch means 18a is engaged and an increasing set point adjusting signal S2, P2 is sent from a master controller H through the conduit 18b to the cascade bourdon 18 the latter will move the beam 1 in the counter-clockwise direction, as seen in Figs. 2 and 3 or when such a signal is decreasing the reverse beam motion will occur. The elements mentioned above and schematically illustrated in Fig. 2, are combined in Figs. 3, 3A and 4 to form control apparatus operative to obtain the aforementioned objects of the present invention.

The embodiment of the invention shown diagrammatically by way of example in Fig. 3 includes, in addition to the apparatus of Fig. 2, a supporting structure including a base plate 30 with transverse panels or plates 31 and 35 at one end. The panel 31 is shown as supporting end portions of parallel, spaced apart, rotatable shafts 32, 33 and 34 above the base plate 30 and extending horizontally away from this panel 31. Each of the shafts 32, 33, and 34 has an end portion journaled in the panel 31. The panel 35 is attached in any suitable manner by the same end portion of the platform 30 to which the panel 31 is attached. At its front side, the panel 35 supports pressure responsive instruments 36, 37, and 38. The instrument 36 measures a fluid pressure transmitted to the instrument through a conduit 36a from the control outlet 36c of a transfer valve manifold 44 shown in Fig. 3A. The instrument 38 measures the fluid pressure being transmitted by pilot valve 12 through a conduit 38b to a second control valve outlet 38c of the manifold 44. The instrument 37 measures the magnitude of a process variable being transmitted by a conduit 37a to an inlet 37b of a transfer valve 42. Variations in the pressure transmitted through the conduits 36a, 37a, or through 15, 38b to the corresponding pressure responsive control instrument 36, 37, or 38, causes the deflecting pressure indicating elements of each of the respective instruments to deflect angularly about its axis to an extent depending on the pressure transmitted to the instrument.

The shaft 32 supports and rotates spaced apart cams 39, 40, and 41 which surround and are attached to portions of the shaft 32 at progressively increasing distances from the panel 31. The end of the shaft 32 remote from the panel 31, extends into and is journaled in a transfer valve structure 42 as shown in Fig. 3A. A gear wheel 43 is mounted on and attached to a portion of the shaft 32 adjacent the transfer valve structure 42. The transfer valve structure 42 is mechanically connected to a transfer valve manifold 44 shown as mounted on the end portion of the platform 30 remote from the panels 31 and 35.

When the shaft 32 is rotated in the counter-clockwise direction opposite from its position shown in Fig. 3, the cam 39 mounted on and turning with the shaft 32, turns a bell crank lever 45 counterclockwise about a pivot post 46 which is anchored to and extends upward from the platform 30. A tension spring 47 holds the arms 45a of the lever 45 in engagement with the peripheral edge of the cam 39 in all angular positions of said cam. The spring 47 has one end connected to a projection 46a carried by the bell crank 45 at some radial distance from the pivot post 46. This spring 47 connects the projection 46a to a post 48 secured to and extending upward from the stationary platform 30. As is hereinafter explained, the lever or bell crank 45 controls the operation of the cascade bourdon unit 18 shown schematically in Fig. 2 and in more detail in Fig. 4.

The rotation of the cam 40 attached to the shaft 32 gives oscillatory movements to a lever 49 about a pivot 50. This pivot 50 is carried by a lug 50a attached at its lower end to the base plate 30. A cylindrical cam follower 51 extending transversely away from the end of the lever 49 adjacent the cam 40 and in substantial parallel alignment with the shaft 32 is shown in contact with the upper peripheral edge of the cam 40. The rotation of the shaft 32 in the counter-clockwise direction opposite from its position shown in Fig. 3, tilts the lever 49 in the clockwise direction about its pivot 50 and thereby moves the member 52 toward the platform 30. The member 52 is shown as comprising an elbow shaped member including a portion parallel to the platform 30 and a portion extending vertically away from the platform 30. The end of the elbow shaped member 52 is shown biased away from the said platform in an upward direction by means of a leaf spring 52a. This spring 52a has its left end anchored to the base plate 30 by any suitable welding material, not shown. In consequence, as the lever 49 is turned clockwise about the pivot 50, the depressed leaf spring 52a will apply an increasing bias in the upward direction against the lever 49. As this lever 49 is tilted counter-clockwise, the leaf spring portion 52a will be permitted to expand and thus apply a decreasing bias in an upward direction on the member 52.

In Fig. 3, a yoke shaped member 53 is shown journalled on an intermediate portion of the shaft 34 at a level above the platform 30. A shaft 54 is transverse to and journalled in the parallel end portions of the yoke 53, and has fixedly mounted on its right end a worm gear 55. The gear 55 has peripheral teeth in mesh with a threaded or worm portion 34c on the shaft 34. This shaft 34 has one end extending through and journalled in the panel 31 and its other end journalled in a support leg 34b which in turn is fixedly attached at its lower end to the base plate 30. A friction wheel 56 is attached for rotation with the shaft 54. When this friction wheel 56 is rotated in a clockwise direction a gear segment 24, which is in frictional engagement with the upper peripheral surface of this wheel 56, is also forced to turn with shaft 26 in a counterclockwise direction and vice versa. The rotation of the wheel 56 is thus used to angularly adjust the position of previously mentioned shaft 26 and the roller element 20 fixedly mounted thereon when the unit is in the position shown in Fig. 3.

The contour of the cam 40 is such that as the left hand knob 32a is turned in a counter-clockwise direction from the manual position shown, the lever 49 will gradually depress the elbow member 52. Since the lower front left portion of the yoke-shaped member 53 is attached thereto, and by welding material to the part of the member 52 that is shown extending to the right of its cross hatched portion the member 53 and the friction wheel 56 pivotally mounted therein will be caused to rotate about the shaft 34 in a counter-clockwise direction when the member 52 is depressed. During the initial 90 degrees of such rotation of the member 53 the gap between the wheel 56 and the segment 24 is gradually increased. The contour of this cam is such as to retain this same gap between the friction wheel 56 and the segment 24 until the knob 32a is approximately 90 degrees from this automatic position.

As the cam 40 is rotated through the last mentioned 90 degrees of counter-clockwise rotation the right end of the lever 49 will be rotated in a counter-clockwise direction about the pivot 50. This rotation will permit the bias of spring 52a to act in an upward direction on 52 to gradually bring wheel 56 again into engagement with segment 24. When the automatic position is reached and the engagement of the wheel 56 is about to occur it would be desirable to provide some means of having the segment 24 brought to its centralized or Fig. 3 position before engaging same. To this end there is shown in Fig. 3 a coil centering spring 27a wrapped around one leg 27b of a U-shaped member which has its base portion mounted on the top of the frame structure 27. If it is desired to more substantially retain this spring 27a on leg 27b the upper end of this leg may be peened over at its upper end or a disc 27e fixedly mounted on same as shown. An upper straight end portion 27c of this spring 27a passes in front of a second leg of the U-shaped member and through a notched out portion 25a on the rear upper edge surfaces of the segment 37. The lower straight end portion 27d of the spring 27a passes behind the second leg portion of the U-shaped member and through a notched out portion 25b on the front upper edge surface of the segment 37.

This spring 27a is thus arranged to constantly bias the segment 24 back to a position shown in Fig. 3 when wheel 56 is disengaged from same. This centering spring further enables the segment 24 to be so aligned with wheel 56 that full right or left rotation of the knob 34a from the position shown in Fig. 3 will not force the segment 37 to be rotated out of contact with the wheel 56.

The contour of the cam 40 and 41 is such that just before the knob 32a reaches either its manual or automatic position the roller 20 will be moved from its disengaged position to a position in which it is frictionally pressing the bar 19 against the fixed column 22.

This arrangement of the contour of the cams 40 and 41 thus affords a means whereby the roller 20 will retain the bar 19 in a fixed position against the column just before the wheel 56 is brought into engagement with segment 24.

The cam 41 carried by the shaft 32, operates to give tilting movements to a lever 57 journaled to turn about a pivot 50 of a pivot means 58 which is fixedly connected at its lower end to the platform 30. The end of the lever 57 adjacent the shaft 32, carries a roller pin 59 which is parallel to the shaft 32 and is moved toward and away from the platform 30 as the shaft 32 is rotated. As such motion takes place the distance between the shaft 32 and the portion of the periphery of the cam 41 engaged by the roller pin 59 will be varied. As the shaft 32 is rotated, the lever 57 to which this roller pin 59 is attached will be forced to move about the pivot means 58 toward and away from the shaft 32. Rotation of the shaft 32 to the manual position shown in Fig. 3 will cause the roller pin 59 and the right end portion 57a of lever 57 to turn about the pivot 50 of the pivot means 58. When this right end portion 57a of the lever 57 is moved to the manual position shown, the portion 57a will have been moved to a position in which the aforementioned spring 28a can move the frame structure 27 and roller 20 mounted thereon into a position in which the roller frictionally retains the bar 19 against the fixed column 22.

Furthermore, when the lever 57 has been moved to this manual position the lever 57 will be in contact with the portion 60 of the frame structure 27 due to the tendency of the spring 28a to normally rotate the frame 27 in a clockwise direction. However, the contour of the cam 41 is so designed that when the frame 27 is in this position the lever 57 will not be applying any downward counter spring force through its right end portion 57a to the portion 60 of the frame 27.

When the roller 20 is in this frictionally engaged position with the bar 19, the bar may readily be moved in an upward or downward direction by rotating the knob 34a of shaft 34 in the desired direction.

When, on the other hand, as the knob 32a and shaft 32 attached thereto is being rotated counter-clockwise to the Automatic position the contour of the cam 41 will gradually force the roller pin 59 away from the shaft 32. This movement in turn will cause the right end portion 57a of the lever 57 to apply a force in a downward direction on the portion 60 of the frame structure 27. When this latter action occurs the frame structure 27 will be forced to turn in a counter-clockwise direction about its pivot shaft 28 against the bias of spring 28a. This action will simultaneously cause the roller shaft 26 and roller 20 mounted thereon to also be moved in a counter-clockwise direction away from engagement with the bar 19.

Since the roller 20 is completely disengaged from the bar 19 as 32a is rotated to the automatic position shown in Fig. 3 the rotation of the knob 34a may now no longer be used to effect an upward or downward movement of the bar 19 as was the case when in the manual position.

As is diagrammatically shown in Fig. 3, the lever 45 is oscillated by movement of the cam 39. This cam 39 is fixedly attached to the rotatable shaft 32 and gives oscillating movements to the part of the lever 65 shown. The relatively small angular movements of the member 45 about its supporting axis 46, oscillates the lever arm 65 and a sleeve 66 attached thereto as shown in Fig. 4 about a stationary shaft 67 which is supported by a yoke-like member 67a. The latter is shown supported by suitable screw means e.g. 68a, 68d to a member 68 to which one end of the cascade bourdon 18 supporting structure is connected. The member 68 may be rigidly connected by means of the substantially Z-shaped plate 68b to the block 68g by a suitable screw connection such as the screw 68c that is threadedly engaged with the threads 68e shown in the block 68g of Fig. 3. Although not shown, a second screw connection is used to connect the member 68b to the screw threads 68f in block 68g of Fig. 3. This block 68g in turn is fixedly attached to the underside of the stationary plate 5a shown in Fig. 3 by any suitable connecting means such as the screws, one of which, 5b, is shown. A helical spring 66a surrounding the sleeve 66 biases the lever 65 for movement about the shaft 67 in the counter-clockwise direction as shown in Fig. 4.

The upper end of the lever 65 has a portion 65a protruding therefrom that is perpendicular to the vertical sloping body portion of the lever 65 shown in Fig. 4. This portion 65a is shown sandwiched between one end of member 69a and a sphere 70 which is rotatably mounted in the outer end portion of a hollowed out cylinder rod 71. The other end of the hollowed out cylindrical rod 71 has its outer peripheral portion fixedly attached to the disc 69. The central portion of this disc contains a bored hole, not shown, whihc is in alignment with a bored hole of a similar diameter 73 passing through a portion of the inner or disc end of the cylindrical rod 71.

A cylindrical rod 74 is shown fixedly mounted at its rear end in any suitable manner to block 68g. This rod 74 is shown protruding through the fixed central portion of a roller bearing 75, a cylindrical block 76 which has a flat upper longitudinal surface, a second disc 77 fixedly attached to the front face of this block and the aforementioned aperture in disc 69. The outer front end of this rod 74 is shown protruding partway into the bored hole 73 in the rod 71. With this arrangement it is readily seen that the aforementioned bearing 75 provides a means whereby the second disc 77 may be mounted for clockwise or counter-clockwise rotation on the fixed cylindrical rod 74.

Fixedly connected to the upper surface of the block 76 is shown one end of a leaf spring 78. The end of this leaf spring 78 is shown with a slot 78a through which two screw means 78b, 78c, pass to adjustably secure this end of the leaf spring 78 to the rotatable block 76. The other end of this leaf spring 78 is shown in Fig. 3 connected to the left end of the beam 1 by means of a channel member 79. This screw and slot arrangement provides a gradient adjusting means between the receiving and balancing bourdons 3, 4 versus the cascade bourdon 18 as will more fully hereinafter be set out.

The member 79 is shown having its upper flange surface fixedly attached to the beam 1 in any suitable manner such as by welding. The lower flange of this member 79 has a conical shaped central portion 81 protruding in a downward direction which pivotally engages the upper surface of the leaf spring 78. The web or vertical portion of the channel 79 is fixedly attached to the vertical leg of an L-shaped member 82. The other leg of this member 82 has a conical shaped central portion 83 protruding in an upward direction which pivotally engages the lower surface of the leaf spring 78. The leaf spring 78 is thus held between the pivots of two opposing conical shaped portions 81 and 83 whose vertical axis are in alignment with one another.

In Fig. 4 there is shown a plate 84 having an inner end fixedly attached to the disc 69 and having an outer end of fork shaped configuration. There is also shown in this figure a cascade bourdon 18 which receives a pressure signal of varying magnitude, for example, from a master controller H as shown in Fig. 1. As this pressure signal is increased the bourdon 18 will tend to straighten. This straightening action will cause its free end to move in a substantially counter-clockwise direction about the cylindrical rod 74. By fixedly attaching a pin 86 to the free end of a bourdon as shown in Fig. 4 this substantially counter-clockwise movement of the bourdon may be transmitted through the forked end of the plate 84 to the disc 69.

On the other hand, if the pressure signal being transmitted to this cascade bourdon is then decreased the bourdon 18 will tend to return to its original position and in so doing cause the pin 86 to rotate the fork plate 84 and disc 69 in the opposite or clockwise direction. Since the clutch discs 69 and 77 are shown separated in Fig. 4 the aforementioned motion will merely rotate the disc 69 and sleeve 71 attached thereto on the cylindrical rod 74. This is made possible by providing a sliding fit between the rod 74 and the hollowed out cylindrical rod 71. When, however, it is desired that this rotary motion of the cascade bourdon 18 be transmitted to the beam 1, it is merely necessary to apply a bell crank force on bell crank 45 in the direction of the arrow shown in Fig. 4 to the lower end portion 64 of the lever 65. This force will cause the lever 65 to rotate in a clockwise direction against the bias of spring 66a. As this clockwise motion occurs, the upper end of the lever 65a will be forced against the sphere 70 which is carried by the hollowed out cylindrical rod 71. Since the hollowed out cylindrical rod 71 has an inner bored out portion that is of a slightly greater diameter than the rod 74 the aforementioned action will cause the rod 71 and the disc 69 attached thereto to be moved along cylindrical rod 74 into frictional engagement with the disc 77. When this latter action occurs either of the aforementioned forms of rotary motion that is being transmitted to the disc 69 can then be transferred to the disc 77 and the block 76 fixedly attached thereto. As disc 77 is rotated, for example, in a clockwise direction, the block 76 and the right end of the leaf spring 78 will be moved in the same direction. As this clockwise rotation takes place the leaf spring 78 will apply an upward force to the upper conical shaped pivot 81 of the channel member 79 which is attached to the left end of the beam 1. On the other hand, if the counter-clockwise rotation of the block 76 takes place the leaf spring 78 will apply a downward force to the lower conical shaped pivot 83 of the L-shaped member 82 which in turn is attached to the beam 1 through 79.

It can thus be seen that the leaf spring and clutching means shown in Figs. 3 and 4 thus provide a means of transducing a pressure increase or decrease in a cascade Bourdon tube into a beam motion which is proportional to that pressure change.

This spring and cascade clutching means is so arranged that the discs 69, 77 are brought directly into frictional driving engagement with one another when the center knob 33a is retaining the cam 33b in the position shown in Fig. 3 and the knob 32a is placed in the automatic position.

If the center knob 33a is retaining the cam 33b in its automatic position the right outer surface of the cam 33b shown in Fig. 3 will then be in contact with part 45b of the bell crank 45. As the cam 33b is rotated to this automatic position the part 45a of bell crank 45 will be moved in a counter-clockwise direction about its pivot 46 to a position in which it is completely out of contact with the surface of the cam 39. If the left knob 32a is then turned to its automatic position this cam 39 movement will not be able to alter the position of the crank 45. It can thus be seen that cascade control will be effected when the left knob 32a is placed in automatic position and the knob 33a is in its cascade position and that no cascade control will take place as long as the knob 33a is in its automatic position.

When the left knob is in the manual position as shown, the cam 39 will have moved the part 45c of crank 45 in a counterclockwise direction about the pivot 46 and will have increased the distance between the posts 48 and 46a to which the ends of the spring 47 are attached. When the bell crank is placed in this latter position and the cam 33b is rotated from its position shown in Fig. 3 in a counter-clockwise direction it will be effective to move the part 45c of bell crank 45 in a counterclockwise direction. It can thus be seen that when the knob 32a is in the manual position shown, cascade control cannot be effected by rotation of the knob 33a as the end 45c of the bell crank 45 is out of engagement with the end portion 64 of lever 65.

*Zeroing adjustment for bourdon No. 3*

In Fig. 3 there is shown a screw adjusting means 3a which projects up through the stationary element 68g and is operably connected to a stationary end of the receiving bourdon 3. By turning this screw 3a in a clockwise or counter-clockwise direction the stationary end of the bourdon may be raised or lowered from the position shown in this figure. To accomplish such a movement in a vertical plane the stationary member may be connected to the block 68g by means of a tongue and groove connection or any other equivalent sliding connection. This screw activating means 3a thus provides a zeroing adjustment for the bourdon 3 or a means of adjusting the force on the beam 1.

*Transfer valve gears*

In Fig. 3A, the gear 43 is shown in driving engagement with the gears 43a and this latter in turn in driving engagement with gear 43b. As the left knob 32a is rotated toward or away from the manual position shown in Fig. 3, the end of the shaft 32 which protrudes into the transfer valve 42, as shown in Fig. 3A, is used to connect, disconnect, and retain certain fluid pressures passing through the transfer valve in the manner shown in Figs. 5–8. The Figs. 5–8 show the various positions that the valves within this transfer valve 44 take as this transfer valve is rotated by knob 32a shown in Fig. 3. For example, when these valves are in their Fig. 5 position the transfer valve will be in a Manually regulated pressure position and when they are placed in the Fig. 3 position the valve will be in an Automatic pressure regulated position. Fig. 6 represents the position that the valve will be in as the knob 32a of Fig. 3 passes through its I position when a switching operation from its Manual to its Automatic position is taking place and Fig. 8 represents the position that the valve will be in as the knob 32 shown in Fig. 3 passes through its II position when a switching operation from an Automatic to its Manual position is taking place. The valving used in this transfer valve 42 is of the kind commonly referred to as a cam actuated poppet valve type which can readily be operably connected to the ends of the shafts 32, 32b, and 32c that protrude into the transfer valve 42 as shown in Fig. 3A. As the shaft 32 is rotated, the inner or valve end of shaft 32c attached to the gear 43a and the shaft 32b attached to the gear 43b will likewise be used to perform certain fluid connecting, disconnecting, and retaining functions within the transfer valve as shown in Figs. 5–8.

A heavy solid line shown in these Figs. 5–8 indicates that the pressure in such a line is the same as the control valve pressure and a very small dash line (- - -) indicates where such control valve pressure lines have been dead ended.

An extremely long dash line, e.g. (——— ———) in Figs. 5–8 indicates that the pressure in such a line is the same as the process variable pressure and a medium dash line, e.g. (— — —) indicates where such process variable pressure lines have been dead ended.

An extremely long alternating dash dot line, e.g. (———.———.) in Figs. 5–8 indicates that the pressure in such a line is the same as the set point pressure and a medium alternating dash dot line, e.g. (—.—.) indicates where such set point pressure lines have been dead ended.

The lines identified as F.A.S. in the drawing identify transmission lines through which a filtered air supply is flowing.

*Manual control*

When the left knob 32a shown in Fig. 3 is in the manual position shown, the valve manifolding, which includes the transfer valve 42 and manifold 44 as shown in Fig. 3A, will be placed in the position shown in Fig. 5. With the valve manifolding in this Manual position it can readily be seen that the output pressure in conduit 15, 16 of the pilot valve 12 will be transmitted through the valve manifolding 42, 44 to the control valve C as indicated by the heavy solid line. It can further be seen that this control valve pressure may be raised or lowered by turning the right knob 34a shown in Fig. 3 in the desired direction. As previously explained this action will cause the roller 20 of Fig. 3 to rotate in such a way as to raise or lower the free end of the receiving bourdon 3 and thus cause the back pressure in the nozzle 11 shown in Fig. 5 to be changed to the value desired. Furthermore, as the back pressure in the nozzle 11 is changed in this fashion, the new resulting output pressure which the pilot valve 12 is then transmitting to the control valve C is also transmitted to the balancing bourdon 4 to restore the beam 1 to a balanced position. With this arrangement the beam is brought to a balanced position when the pressure in the balancing bourdon 4 is applying a force of sufficient magnitude to balance out the beam force which occurred during the initial deflection of the receiving bourdon 3. The output fluid pressure of the pilot valve 12 is also permitted by conduits 15, 16 and the valve manifolding 42, 44 to be administered to the receiving bourdon 3. When, however, this output pressure enters the receiving bourdon it will not alter the original position of same to which it has been forced by a manually operated roller strip means 19, 20. The reason for this is that this output pressure now entering the receiving bourdon 3 is exactly equal to the magnitude of the pressure necessary to alter the position of the receiving bourdon 3 to its present manually moved position. It can thus be concluded that when the bumpless switching unit is in the manual control position shown in Fig. 5 the pressure in the receiving bourdon 3 equals the pressure in the balancing bourdon 4 and the pressure being administered to the control valve C by the pilot valve 12 as is indicated by the heavy solid line running between these two elements.

*Manual to automatic control*

As the left knob 32a shown in Fig. 3 is being moved through the position I, the rotation of the shaft 32 will have caused the valve manifolding 42, 44 to pass through a position such as that shown in Fig. 6. When the valve manifolding 42, 44 is moved through this Fig. 6 position the pressure that was being applied to the control valve C by the pilot valve 12 in Fig. 5 is now shown, in Fig. 6, dead ended into the valve manifolding 42, 44 rather than passing through the manifolding to the receiving bourdon 3.

This valve manifolding 42, 44 now permits the process variable P.V. to pass through passageways in valve manifolding 42, 44 to the receiving bourdon 3. In Fig. 6 it can be readily seen that as the left knob 32a of Fig. 3 is turned through the I position the pressure that was being administered to the control valve C, as shown in Fig. 5, is now retained in the reset feedback line of the flow controller F. In switching from manual to automatic control it will be necessary to go through the II position shown in Fig. 3. Passing through this II position will not adversely effect a bumpless switching operation because during the final stage of this continuous switching the switch will pass through an I position. As the switch is turned through this I position it prepares the switching system for such a manual to automatic shift just before the switch reaches the automatic position as will hereinafter be described.

It can be seen in Fig. 6 that as the process variable P.V. is applied to the receiving bourdon 3, the bourdon will apply a force proportional to this process variable pressure to the beam 1. This is possible because in this Figure 6 position the cam 41 which is shown in Fig. 3 will have moved the roller 20 away from its frictionally engaged position with the strip 19 as schematically shown by the dotted line position of these elements in Fig. 2. This last mentioned beam action will cause the back pressure in the nozzle shown in Fig. 6 to be changed to a value which is proportional to the pressure being applied to the receiving bourdon. As the process variable pressure causes the back pressure in the nozzle to be changed in this manner the pilot valve 12 will deliver a pressure proportional to the nozzle back pressure to the balancing bourdon 4 to force balance the beam 1 and will transmit this same pressure to a set point chamber of the flow controller F. Although not shown in the drawing it may be desirable to employ a separate switch in the process variable line for cutting in the P.V. pressure directly with the set point chamber in lieu of having to send the process variable through the bumpless switching unit before it is sent to the set point chamber. In this way it is possible for the bumpless switching unit to bring the valve pressure in the set point conduit shown in Fig. 5 into very close approximate alignment with the process variable as shown by the movement of the pointer of the indicator 38 from its dotted line position to its solid line position in Fig. 6.

Since the process variable and the set point pressures being transmitted to the flow controller F as shown in Fig. 6 are made nearly equal in this manner the output pressure of the flow controller which is then locked out from the control valve C by the valve manifolding 42, 44 will be equal to the pressure which has been locked in the reset feedback line when the unit was shifted from the Fig. 5 position. Because of the action that takes place as the knob 32a is rotated through this I position the knob 32a of Fig. 3 may continuously be moved from the manual position shown in Fig. 5 to the automatic position shown in Fig. 7.

When the knob 32a has reached the automatic position shown in Fig. 7 the output pressure of the flow controller F will then be permitted by the valve manifolding 44, 42 to be connected to the reset feedback line which has retained the valve pressure on the control valve C which was established when in the manual or Fig. 5 control position. Since the output or valve pressure of this flow controller F is now of the same magnitude as the pressure in the reset feedback line no bump will be experienced when the knob 32a has been rotated to this automatic Fig. 7 position. When the left knob 32a shown in Fig. 3 has been turned to the automatic position, the valve manifolding 42, 44 shown in Fig. 7 will have cut out the process variable P.V. pressure from being transmitted to the receiving bourdon and will have cut in the set point S.P. pressure of the flow controller F with this receiving bourdon 3 and the balancing bourdon 4.

Furthermore, when the pointer 32a is in this automatic position the roller 20 shown schematically in Fig. 2 will have been moved back into frictional engagement with the bar 19 and the friction wheel 56 in Fig. 3 rotated into engagement with the segment 24. As previously explained when the roller 20 and friction wheel 56 are engaged and the bumpless switching unit is placed in this automatic position, rotation of the right knob 34a in one direction will pull the bar 19 and the free end of the bourdon 3 in a downward direction and rotation of the knob in the opposite direction will permit raising of the bar 19 and the free end of the Bourdon tube 3. As the right knob 34a adjusts the free end of the bourdon 3 in this manner the spring 7 attached to the free end of this bourdon will apply a force that is proportional to the degree to which the knob 34a has been rotated, to the lug 7a, on the underside of the beam 1 as best shown in Fig. 3. As a downward force is applied, for example, to the bar 19 by roller 20 this spring 7 will cant the beam 1 and flapper portion 1c about its pivot 2 in such a way as to move the right end of the flapper beam portion toward the nozzle 11. This action causes the pilot valve 12 connected to the nozzle, by way of conduit 11a, to deliver a proportionally greater output pressure through the conduits 15, 16 to the balancing bourdon 4. As shown in Fig. 7 this conduit 16 is also connected to the set point pressure line of the flow controller F.

It will thus be evident that when the left knob 32a is in an extreme left, or in other words, an automatic position, and the right knob 34a is turned so as to increase or decrease the force applied by the spring 7 on beam 1, the set point pressure being transmitted to the flow controller through the set point conduit 16 shown in Fig. 7 will likewise be increased or decreased.

*Automatic to manual control*

When shifting from this automatic control position as shown in Fig. 7 directly to the manual control position as shown in Fig. 5 it is necessary to turn the knob 32a through a II indicating position shown on the panel 31 in Fig. 3. As the knob 32a is turned through this II position or the position as shown in Fig 8 of the drawing, the valve manifolding 42, 44 will lock out the flow controller's output valve pressure from the head of the control valve C. This valve manifolding 42, 44 is so positioned to prevent the set point pressure S.P. in the set point conduit from being administered to the receiving bourdon 3. Furthermore, when the bumpless switching unit is in this Fig. 8 position, the roller 20 will have been moved out of engagement with the bar 19 as shown by the dotted line position shown in Fig. 2.

Also, the control valve pressure, locked in the reset feedback line between the controller F and the control valve C, is administered to the receiving bourdon so as to make the pressure now in the receiving bourdon equal to the pressure that was being administered to the control valve when in the automatic position shown in Fig. 7.

When this control valve pressure enters the receiving bourdon 3 the bourdon will be expanded or contracted. This expansion or contraction is transmitted through the spring 7 to the beam 1. This expansion and contraction will cause the spring 7 to apply a force of decreased or increased magnitude to the beam 1 and cause the beam to move in a clockwise or counter-clockwise direction about the pivot 2. This clockwise or counter-clockwise rotation of the beam 1 will in turn cause a change in the back pressure of the nozzle 11. This back pressure change in the nozzle will, as previously explained, cause the fluid pressure output of the pilot valve to change in a similar proportional manner. The pilot valve 12 is so arranged that it will bleed off or increase the pressure in the set point line of the controller depending on whether the control valve pressure in the receiving bourdon is less or greater than the pressure that the bourdon contains when the manifolding 42, 44 was shifted from the position shown in Fig. 7 to the position shown in Fig. 8.

In the aforementioned manner the set point pressure is therefore made equal to the control valve pressure as the left knob is being actuated through II, or Fig. 8 position when shifting from automatic to manual control. In switching from automatic to manual control it will be necessary to go through the I position. Passing through this I position will not adversely effect a bumpless switching operation because during the final stage of this continuous switching the switch will pass through a II position. As the switch is turned through this II position it prepares the switching system for such an automatic to manual shift by making the set point pressure S.P. equal to the control valve pressure that existed in the V.P. line before this control valve P was cut off by the valve manifolding 42, 44 from being sent to the control valve as shown in Fig. 8, or, in other words, when in the II position shown in Fig. 3 just before the switch reaches the manual position as will hereinafter be described.

Just before the knob 32a is positioned in the manual position in making this direct switch from automatic to manual control the roller 20 will again engage the bar 19 attached to the free end of the receiving bourdon 3 as shown in Fig. 2 so that the pressure transmitted to the control valve C may be manually regulated as previously noted under the description of Fig. 5.

*Manual to automatic cascade*

The present invention suggests a novel way to shift from the manual Fig. 5 position to a position in which the friction discs 69, 77 of Fig. 4 are engaged. When the apparatus is in this latter position a variable pressure signal can be transmitted from a master controller H to the cascade bourdon 18 in the form of a force on the left end of the beam 1. To accomplish such a shift with the subject bumpless switching apparatus, it is only necessary to perform the following operations: The center knob 33a is turned from the "automatic" to the "cascade" position shown in Fig. 3. When the knob 33a is in this cascade position and the knob 32a is in the manual position, the spring 66a shown in Fig. 4 will retain the cascade clutch discs 69, 77 out of engagement with one another as previously explained. When the left knob 32a is then turned through position I as shown in Fig. 3 the control valve pressure which is being transmitted to the bourdon 3 as shown in Fig. 5 will then be cut out and instead a process variable pressure will be transmitted to this receiving bourdon 3 as shown in Fig. 6. This action will cause the receiving bourdon 3 to expand or contract depending on whether the process variable is greater or less than the control valve pressure that was in the receiving bourdon when the bumpless switching unit was in Fig. 5 position. Since the roller 20 is disengaged as the knob 32a passes through this I position the expansion or contraction of this bourdon will be transmitted through the series spring 7 to the left end of the beam 1. This force on the beam 1 will cause the back pressure in the nozzle 11 to be either increased or decreased in a similar manner. This latter pressure will activate the pilot valve 12 to a position in which the pilot valve either bleeds to atmosphere any excess pressure in the set point line between the flow controller and the balancing bourdon or increases the pressure in this line to a point where it very closely approximates the process variable.

It can thus be seen that as the left knob is turned through the No. I position that the process variable P.V. in the receiving bourdon 3 will cause the magnitude of the set point pressure in the set point line to be brought to the same value as the process variable by means of the beam 1, pilot valve 2, and balancing bourdon 4.

Since this balancing out of the set point pressure with the process variable takes places as the knob 32a is swept through the No. I position the knob 32a is thus moved directly from manual through this No. I position to the "automatic" position without causing a pressure bump on the control valve C. When the knob 32a has moved to this automatic position, the cam 33b, if then in the position shown in Fig. 3, will have permitted the rotation of the bell crank 45 to have moved the lever 65 in a clockwise direction about the pivot 67 shown in Fig. 4. As already set forth in the specification this action will cause the disc 69 to be frictionally engaged with 77. When this disc clutching action has taken place any pressure signal change transmitted from a master controller or similar apparatus to the cascade bourdon 18 will cause the leaf spring 78 to be rotated with the partial cylindrical block 76 on the bearing 75 mounted on the cylindrical, stationary rod 74 so as to apply a downward or upward force to the left end of the beam 1.

It can thus be seen that with such a cascade bourdon unit as shown in Fig. 4 the set point pressure of a flow controller F may be altered by means of a remotely located master controller H shown in Fig. 1.

Since the bar 19 is engaged by means of the roller 20 and the friction wheel 56 is in engagement with the segment 37 when in this automatic-cascade position, rotation of the knob 34a may also be used to adjust the overall set point of the flow controller by manually moving the free end of the receiving bourdon 3 in an upward or downward direction. The rotation of knob 34a thus either may be used to subtract from or add to the force applied by the cascade bourdon 85 to the beam 1.

*Cascade to automatic*

If it is desired to again return the bumpless switching unit from this cascade position to the automatic position in which the disc 69, 77 of the cascade unit is disengaged it is necessary to rotate knob 32a to its Manual position and then rotate the knob 33a to the automatic position. As knob 32a is moved past the II position in shifting back from the "cascade" position to the manual position the same pressure balancing action will occur as had taken place when this knob was turned through this II position during the previously described Manual to Automatic bumpless switching operation.

The present invention thus provides an apparatus which permits a direct shift between an automatic type of cascade control and a manually controlled position to take place without incurring a bump in the pressure being applied to the head of the control valve C.

It is readily apparent that the bumpless switching unit shown in Fig. 3 provides a very simplicit way of having a master controller alter the set point of a flow controller by merely applying the effect of the force of such a set point pressure to the end of a beam 1.

With the aforementioned described bumpless switching unit it can be seen that a cascade force can readily be clutched into or out of engagement with the beam 1 when the knob 32a has been placed in the automatic position shown in Fig. 3.

While, in accordance with the provisions of the statutes, I have illustrated and described the best form of the invention now known to me, it will be apparent to those skilled in the art that changes may be made in the form of the apparatus disclosed wtihout departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. A control system comprising, a pneumatic controller having a reset feedback chamber, a manually operated bumpless switching unit for regulating the magnitude of a fluid supply pressure that is transmitted to a control valve in a flow line, said switching means comprising a rotatable valve manifolding which when continuously rotated between a first manual control regulating position and a second automatic controller regulated position is operably connected to initially lock in the said transmitted fluid pressure between said control valve and said feedback chamber of said controller, a force balanced pressure regulating mechanism connected to said manifold to secondly alter the pressure level of the fluid pressure in a set point chamber of said controller to a level that is equal to the fluid pressure in a process variable chamber of said controller that is proportional to the flow of a fluid passing through said flow line as said valve is rotated between said first and second positions and said rotatable valve manifolding being operably connected to finally cut in an output fluid control pressure of said controller with said initially locked in fluid pressure being transmitted to said control valve as said rotatable valve manifolding is continuously rotated between said manual control pressure regulating position and said automatic controller pressure regulating position.

2. A control system comprising, a pneumatic controller having a rest feedback chamber, a manually operated bumpless switching unit for regulating the magnitude of a fluid supply pressure that is transmitted to a control valve in a flow line, said switching means comprising a rotatable valve manifolding which when continuously rotated between a first manual control regulating position and a second automatic controller regulated position is operably connected to initially lock in the said transmitted fluid pressure between said control valve and said feedback chamber of said controller, a force balanced pressure regulating mechanism connected to said manifold to secondly alter the pressure level of the fluid pressure in a set point chamber of said controller to a level that is equal to the fluid pressure in a process variable chamber of said controller that is proportional to the flow of a fluid passing through said flow line as said valve is rotated between said first and second positions and said rotatable valve manifolding being operably connected to finally cut in an output fluid control pressure of said controller with said initially locked in fluid pressure being transmitted to said control valve when said process variable and set point chamber pressures have been made equal by said force balancing pressure regulating mechanism as said manifolding is continuously rotated between said manual and said automatic controller regulated positions.

3. A fluid regulating means for directly and bumplessly switching a control apparatus between a position in which a control pressure being transmitted to the head of a control valve in a flow line is controlled in one instance by a manual operation and in another instance by an automatically operated pneumatic controller comprising, a pivoted beam, a first manually operated means for applying a first tension to one end of said beam and the free end of a first pressure responsive means, a bleed nozzle, a supply fluid flowing to said nozzle and to a pneumatic relay, said beam being operably movable toward or away from said nozzle in accordance with the magnitude of said first tension so as to change the pressure in said nozzle, said relay being operably connected to said pressure in said nozzle to produce an output control pressure signal whose magnitude is proportional to the said movements toward and away from said nozzle, a second pressure response means operably connected to said control pressure signal, said second response means acting to apply a tension opposite and equal to said first tension to said beam as said control pressure signal is applied thereto, a valve manifolding for connecting said control pressure signal to said first responsive means, a second manually operated cam and lever actuating means for manually rotating continuously said valve manifolding between a manual and an automatic control position, said manual rotation of said valve manifolding means by said second manually operated means acting to rotate said manifolding means to a position that connects a fluid pressure in a process variable chamber of said pneumatic controller with said first response means, to disconnect the control pressure to said first response means during the initial rotation of said valve manifolding means between said two positions, and to momentarily disconnect said first manually operated tension means from said beam, said process variable chamber fluid pressure in said first response means acting to apply a second tension to said beam to move same toward or away from said nozzle so as to change the pressure in said nozzle, said relay acting to produce a second control pressure in response to said last mentioned fluid pressure change in said nozzle, said second response means acting in response to said second control pressure to apply a second tension to said beam which is equal and opposite to the process variable pressure acting on said first pressure responsive means, a connection between the reset feedback chamber of said pneumatic controller said control valve and said first mentioned control pressure, said second manually operated cam and lever actuating means acting to disconnect said connection between said first control pressure and said feedback chamber and said connection between the first control pressure and the control valve and acting to connect said second control pressure to a set point chamber of said controller during its said initial rotation of said valve manifolding means between said manual and automatic position and said second manually operated means acting on said valve manifolding to disconnect said process variable fluid pressure from said first pressure response means and to connect said set point chamber fluid pressure to said first pressure response means and an output pressure fluid from said controller to said reset feedback chamber and said final control element during the final rotational movement of said second operated means between said manual and automatic position and wherein said second manually operated means also acts to reengage said first manually operated tension means with said first pressure response means so that rotation of said first manually operated means will alter the magnitude of the fluid pressure that said pilot valve is transmitting to the set point chamber of said controller.

4. A control system comprising, a pneumatic controller having a reset feedback chamber, a manually operated bumpless switching unit for regulating the magnitude of a fluid supply pressure that is transmitted to a control valve in a flow line, said switching unit comprising a rotatable valve manifolding, a manually rotatable cam and lever means connected to said manifolding to sequentially alter the position of valves in said manifolding, said manual rotatable means being operable to effect a rotation of said manifolding from a position in which said transmitted pressure is locked in between said control valve and said feedback chamber of said controller, a force balanced pressure regulating mechanism in said bumpless switching unit to cut in a process variable pressure that is proportional to the flow of a fluid passing through said flow line that is being transmitted to a process variable chamber of the controller with a set point chamber in said controller, and said switching means being finally operable to cut in an output control pressure of said controller with said initially locked in pressure being transmitted to said final control element as the manually rotatable cam and lever means continuously rotates said manifolding between a manual control pressure regulating position and an automatic control regulated position.

5. A control system comprising the combination of a pneumatic controller for automatically regulating the magnitude of a fluid supply pressure that is transmitted to the head of a control valve in a flow line and a manually operated bumpless switching unit, comprising, a mechanical means for switching a valve manifolding in said unit directly and continuously from an automatic control position to a manual control position, said manual means for switching being operably connected to said manifolding to cause manifold to cut in a fluid pressure in a conduit connecting a feedback line of said controller to said control valve with a fluid pressure regulating and balancing means forming a part of said bumpless switching unit during an initial stage of said switching action, said pressure regulating and balancing means operably arranged to continually adjust the level of a fluid pressure in a set point chamber of said controller until it is equal to the level of said fluid pressure in said feedback line during a second stage of said continuous switching, and said switching action further acting to connect the fluid pressure in said set point pressure line with the said feedback fluid pressure during a final stage of said continuous switching.

6. A fluid pressure regulating means for directly and bumplessly switching a control apparatus between a position in which a control fluid pressure being transmitted to the head of a control valve in a flow line is controlled in one instance by an automatically operated pneumatic controller and in another instance by a second manually operated means comprising, a first fluid pressure connection between a reset feedback chamber of said pneumatic controller and said control valve, a passageway to transmit the fluid pressure in an output fluid pressure chamber of said controller through a valve manifolding to said first fluid pressure connection, a second passageway to transmit the fluid in a set point fluid chamber of said controller through said valve manifolding to a first pressure response means, a first manually operated means to continuously rotate a valve within a valve manifolding from an automatic control position to a manual control position, said valves in said manifolding being operably arranged to cut off the said output fluid pressure of said controller from said fluid pressure in said first fluid pressure connection, to cut off the said fluid pressure in said set point pressure chamber of said controller from said first fluid pressure response means, and to cut in said fluid pressure in said first fluid pressure connection in said reset feedback connection with said first fluid pressure response means, a first means for applying a tension to a movable portion of said first tension means, said first manually operated means being operably connected with said first tension means to disconnect said first tension means from said first pressure response means, said reset feedback fluid pressure being operably connected to said first pressure response means to apply a force to one end of a pivoted flapper beam that is proportional to the pressure being applied by said controller to said valve, a bleed nozzle positioned at one end of said beam, a supply fluid flowing to and through said nozzle and to a pneumatic relay, said flapper beam being operably movable toward or away from said nozzle in accordance with the magnitude of said force being applied by said first pressure response means to change the pressure of the fluid in said nozzle, said relay operably connected to said fluid pressure in said nozzle to effect a change in the fluid pressure in a set point fluid pressure line that connects a second pressure response means to said set point chamber of said controller, said second pressure response means operably connected to apply a force opposite and equal to said first force on said beam, said second pressure response means being operably positioned on said beam to make the pressure in said set point pressure line equal to the first fluid pressure in said reset feedback line, said first manual operated means being operably connected with said valves in said manifolding to cut in said fluid pressure in said set point pressure line with the said reset feedback fluid pressure being applied to said head of said control valve and to re-engage said first tension means with said first pressure response means, and a second manually operated means to effect a change in said fluid pressure in said reset feedback connection by changing the force being applied to said first tension means.

7. A control system comprising the combination of a pneumatic controller for automatically regulating the magnitude of a fluid supply pressure that is transmitted to the head of a control valve in a flow line and a manually operated bumpless switching unit comprising, a mechanical means to switch a valve manifolding in said switching unit directly and continuously from an automatic control position to a manual control position, said mechanical means being operably connected to said valve manfolding to cut in a pressure in a conduit running between a feedback line of said controller and said head of said control valve with a fluid pressure regulating and balancing means that forms a part of said unit during an initial stage of said switching from said automatic to said manual position, said fluid pressure regulating and balancing means acting to continuously regulate the level of a fluid pressure in a set point chamber of said controller unit it is equal to said fluid pressure in said feedback line during a second stage of said switching, and said mechanical means being operably connected to said valve manifolding to connect the fluid pressure in said set point pressure line with said pressure in said feedback line when said pressure regulating and balancing means has made the said set point fluid pressure equal to the fluid pressure in the said reset feedback line during the final stage of said switching.

8. A control system comprising the combination of a pneumatic controller for automatically regulating the magnitude of a fluid supply pressure that is transmitted to the head of a control valve in a flow line and a manually operated bumpless switching unit comprising, a mechanical means to switch a valve manifolding in said switching unit directly and continuously between either a manual and automatic control position or in a reverse manner between said automatic and said manual control position, a fluid pressure regulating and balancing mechanism in said unit, said fluid pressure regulating and balancing mechanism being operably connected to said valve manifolding to make the fluid pressure in a set point chamber of said controller equal to the fluid pressure in a process variable chamber of said controller while an output fluid pressure from said controller is being transmitted to said control valve is retained within a reset feedback chamber of said controller during said manual to automatic switching, and said fluid pressure regulating and balancing mechanism also being operably connected to said valve manifolding to make the said fluid pressure in said set point chamber equal to the fluid pressure in said reset feedback chamber of said controller that is connected to said control valve while said output fluid pressure being transmitted by said controller to said control valve is retained within said controller during said automatic to manual switching.

9. A control system comprising the combination of a pneumatic controller for automatically regulating the magnitude of a fluid supply pressure that is transmitted to the head of a control valve in a flow line and the manually operated bumpless switching unit comprising, a mechanical means to switch a valve manifolding in said switching unit directly and continuously between either a manual and automatic control position or in a reverse manner between said automatic and said manual control position, a fluid pressure regulating and balancing mechanism in said unit, said fluid pressure regulating and balancing mechanism being operably connected to said valve manifolding to make the fluid pressure in a set point chamber of said controller equal to the fluid pressure in a process variable chamber of said controller while the fluid pressure being transmitted to said control valve is retained within a reset feedback chamber of said controller during said manual to automatic switching and said valve manifolding acting to connect an output fluid pressure of said controller with said fluid pressure being transmitted to said control valve when said mechanical means reaches said automatic control position, said fluid pressure regulating and balancing mechanism also being operably connected to said valve manifolding to make the fluid pressure in said set point chamber equal to the fluid pressure in the reset feedback chamber of said controller that is connected to said control valve while said output pressure being transmitted by said controller to said control valve is retained within said controller during said switching between said automatic to manual control position and said valve monifolding acting to connect the fluid pressure in said set point chamber with the fluid pressure in said reset feedback chamber connection when said mechanical means reaches said manual position.

10. A control system comprising a bumpless switching unit having a fluid pressure regulating and balancing means and a valve manifolding, a secondary controller, and a master controlling means to generate a first fluid pressure signal that is proportional to the magnitude of a first variable, said control system containing a fluid pressure to force transducer operably connected to said unit and said master controlling means to apply a force that is proportional to the magnitude of said first fluid pressure signal, said transducer being operably connected to said fluid pressure regulating and balancing means, an operable connection between said fluid pressure balancing means and said secondary controller to transmit a fluid pressure to a set point chamber of said secondary controller in accordance with a change in the magnitude of said force being applied to said fluid pressure regulating and balancing means when said valve manifolding of said bumpless switching unit is positioned in an automatic cascade control position, a mechanically operated clutch means to disconnect said transducer from said fluid pressure regulating and balancing means when said valve manifolding of said bumpless switching unit is positioned in a manual control position, means for generating a second fluid pressure signal of a magnitude that is proportional to the magnitude of the flow of fluid passing through a flow line, a first means to connect said second fluid pressure to a process variable chamber of said secondary controller and a second means to connect said second fluid pressure to said valve manifolding, a third means to connect the fluid pressure in the output fluid pressure chamber of said secondary controller with the head of a control valve controlling the flow of fluid through said flow line valve to regulate the position of said valve and said magnitude of said flow of fluid passing through said flow line being controlled thereby in accordance with changes in the magnitude of said fluid pressure being transmitted by said fluid pressure regulating and balancing means to the said set point chamber of said secondary controller.

11. A control system comprising a bumpless switching unit having a fluid pressure regulating and balancing means and a valve manifolding, a secondary controller, and a master controlling means to generate a first fluid pressure signal that is proportional to the magnitude of a first variable, said control system containing a fluid pressure to force transducer operably connected to said unit and said master controlling means to apply a force that is proportional to the magnitude of said first fluid pressure signal, said transducer being operably connected to said fluid pressure regulating and balancing means, an operable connection between said fluid pressure balancing means and said secondary controller to transmit a fluid pressure to a set point chamber of said secondary controller in accordance with a change in the magnitude of said force being applied to said fluid pressure regulating and balancing means when said valve manifolding of said bumpless switching unit is positioned in an automatic cascade control position, a mechanically operated clutch means to disconnect said transducer from said fluid pressure regulating and balancing means when said valve manifolding of said bumpless switching unit is positioned in a manual control position, means for generating a second fluid pressure signal of a magnitude that is proportional to the magnitude of the flow of fluid passing through a flow line, a first means to connect said second fluid pressure to a process variable chamber of said secondary controller and a second means to connect said second fluid pressure to said valve manifolding, a third means to connect the fluid pressure in the output fluid pressure chamber of said secondary controller with the head of a control valve controlling the flow of fluid through said flow line valve to regulate the position of said valve and said magnitude of said flow of fluid passing through said flow line being controlled thereby in accordance with changes in the magnitude of said fluid pressure force being applied by said transducer to said fluid pressure regulating and balancing means.

12. A clutching mechanism for bumplessly switching a control unit for a control valve in a flow line directly and continuously between either a manual and an automatic cascade control position or in the reverse manner between said automatic cascade control position and said manual control position comprising, a force balance pressure regulating mechanism operably connected to said control valve to effect a control action on same, a first manually operable means for clutching in a rotatable pressure response member containing a first pressure therein to one end of said force balance pressure regulating and balancing mechanism, said pressure regulating and balancing mechanism also being operably connected to equalize the pressure in a set point chamber of a pneumatic controller with the magnitude of a process variable pressure before the switch from said manual to automatic cascade control position is accomplished and a second manually operated means interlocked with said first manual operated means for disengaging said clutching means when said mechanism is switched between said automatic cascade and manual control position, said last mentioned de-clutching action providing a direct and continuous means of switching from a position in which the control action of said force balancing pressure regulating mechanism is automatically regulated to a position in which said control action is manually regulated.

13. A bumpless switching unit to switch a control unit for a control valve directly and continuously between either a manual and an automatic cascade control position or in the reverse manner between said automatic cascade control position and said manual control position, comprising a first means for regulating the fluid pressure on said control valve manually, a second means for automatically regulating the fluid pressure on said control valve when in said automatic cascade position in accordance with changes in a master variable signal, and a switching unit operably connected to said first and second means to provide a direct means of continuously switching the control of said fluid pressures between said first and second means or in a reverse manner between said second and first means without incurring a bump in said fluid pressure.

14. A bumpless switching unit, comprising a first means for regulating the fluid pressure on a control valve manually, a second means for regulating the fluid pressure on said control valve in an automatic-cascade mode of operation, a switching unit for providing a means of continuously switching the control of said fluid pressures between said first and second means or in a reverse manner between said second and first means without incurring a bump in said fluid pressure, said second means comprises a conventional pneumatic controller having a set point chamber containing a pressure which is automatically regulated by the output pressure signal of a master controller and wherein a means is provided in said bumpless switching unit to manually adjust the overall value of said set point pressure when said second means is regulating said pressure on said control valve.

15. A bumpless switching unit, comprising a first means for regulating the fluid pressure on a control valve manually, a second means for regulating the fluid pressure on said control valve in an automatic-cascade mode of operation, a switching unit for providing a means of continuously switching the control of said fluid pressures between said first and second means or in a reverse manner between said second and first means without incurring a bump in said fluid pressure, said second regulating means being comprised of a means for supplying a fluid pressure to a fluid pressure to force transducer that is operable to regulate the force applied to a force balance beam and said fluid pressure to said control valve in accordance with changes in a master variable signal when said second regulating means is in control, and wherein said first regulating means comprises a rotary motion to tension transducer for regulating the tension applied to said beam in accordance with the direction and degree to which a rotatably actuated control knob means is rotated when said first regulating means is being controlled.

16. Apparatus for use in a fluid controller bumpless switching apparatus comprising, a pivoted beam, a fluid pressure flapper-nozzle apparatus positioned relative to said beam to be adjusted thereby, a first pressure responsive means connected to said beam and to the nozzle of said flapper-nozzle apparatus to apply a force to said beam in accordance with the back pressure of said nozzle, and a force producing means connected to said beam to provide an input force thereto for altering the amount of fluid bled from said flapper-nozzle apparatus, said force producing means comprising a second pressure responsive means having a free end coupled to said beam through a resilient member, a manual means for adjusting the position of the free end of said second pressure responsive means with respect to said beam, and clutch means for releasably coupling said manual means to said free end.

17. The apparatus for use in a fluid bumpless switching apparatus as set forth in claim 16 further comprising, a third pressure response means and a clutch for operably connecting or disconnecting a movable portion of said third response means to said beam.

18. The apparatus for use in a fluid controller bumpless switching apparatus as set forth in claim 16 further comprising, a means for supplying a fluid pressure to a fluid pressure to force transducer, a means for clutching a free expandable force producing end of said transducer with said beam while said clutch between said manual means and said second response member is engaged, said transducer acting to provide an input controlling force to said beam to change the position of said beam with respect to said nozzle and said movement of said manual positioning means while in said clutched position with said second response member acting to alter the overall control force being applied to said beam.

19. Apparatus for use in a fluid controller bumpless switching apparatus comprising a pivoted beam, a fluid pressure flapper-nozzle apparatus positioned relative to said beam to be adjusted thereby, a first pressure responsive means connected to said beam and to the nozzle of said flapper-nozzle apparatus to apply a force to said beam in accordance with the back pressure of said nozzle, and a force producing means connected to said beam to provide an input force thereto for altering the amount of fluid bled from said flapper-nozzle apparatus, said force producing means comprising a second pressure responsive means having a free end coupled to said beam through a resilient member, a conduit connecting said back pressure in said nozzle to said second responsive means, a manual means for adjusting the position of the free end of said second pressure responsive means with respect to said beam to a desired position, and clutch means for releasably coupling said manual means to said free end while in said desired position without altering the position of said beam adjusted flapper-nozzle.

References Cited in the file of this patent
UNITED STATES PATENTS

| | | |
|---|---|---|
| 2,588,799 | Booth | Mar. 11 1952 |
| 2,677,385 | Markson | May 4, 1954 |
| 2,706,994 | Moore | Apr. 26, 1955 |
| 2,719,535 | Anderson | Oct. 4, 1955 |
| 2,729,222 | Dickey et al. | Jan. 3, 1956 |
| 2,730,379 | Gorrie | Jan. 10, 1956 |
| 2,731,023 | Panich et al. | Jan. 17, 1956 |
| 2,737,963 | Gorrie et al. | Mar. 13, 1956 |
| 2,747,595 | Dickey | May 29, 1956 |